United States Patent
Liu

(10) Patent No.: US 6,429,272 B1
(45) Date of Patent: Aug. 6, 2002

(54) HYDROCARBON RESINS FROM ARYL NORBORNENE DERIVATIVES

(75) Inventor: Yun-Shan Liu, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/957,379

(22) Filed: Sep. 20, 2001

(51) Int. Cl.$^7$ .............................. C08F 32/04; C08F 4/14
(52) U.S. Cl. ...................... 526/281; 526/237; 526/308; 526/347; 525/333.3; 525/338; 524/553
(58) Field of Search .................... 526/237, 281, 526/308, 347; 525/333.3, 338; 524/553

(56) References Cited

U.S. PATENT DOCUMENTS

| | | | |
|---|---|---|---|
| 2,721,189 A | | 10/1955 | Anderson et al. |
| 3,330,815 A | | 7/1967 | McKeon et al. |
| 3,494,897 A | * | 2/1970 | Reding et al. ............... 526/281 |
| 4,342,850 A | | 8/1982 | Allen et al. |
| 4,393,261 A | | 7/1983 | Allen |
| 4,801,668 A | | 1/1989 | Beavers |
| 4,931,520 A | * | 6/1990 | Yamanashi et al. ......... 526/281 |
| 5,656,698 A | | 8/1997 | Hentges et al. |
| 5,693,721 A | | 12/1997 | Hentges et al. |
| 6,054,543 A | | 4/2000 | Bergstrom et al. |

OTHER PUBLICATIONS

Kim, J. K. et al, Polymer, 41, 5195–5205 (2000), "The Aromatic Hydrocarbon Resins with Various Hydrogenation Degrees", Part 1.

Ryu, D. Y et al, Polymer, 41, 5207–5218, (2000), "The Aromatic Hydrocarbon Resins with Various Hydrogenation Degrees", Part 2.

Bergstrom, et al, Journal of Applied Polymer Science, 67, 385–393 (1998), "Influence of the Polymerization Conditions on the Rigidity of Phenylnorbornene–Ethylene Copolymers Made Using Ethylene bis (indenyl) zirconium dichloride and MAO".

* cited by examiner

*Primary Examiner*—Fred Teskin
(74) *Attorney, Agent, or Firm*—B. J. Bosheers; Bernard J. Graves, Jr.

(57) ABSTRACT

There are disclosed novel homopolymers of 5-aryl-2-norbornene, and novel interpolymers of 5-aryl-2-norbornene with at least one other cyclic or acyclic alkene, and hydrogenated hydrocarbon resins resulting from hydrogenation of the homopolymers and interpolymers. The products are particularly useful as tackifiers. Also disclosed is a novel process for preparing the homopolymers and interpolymers of the 5-aryl-2-norbornene, wherein there is used as the polymerization catalyst, a Friedel-Crafts catalyst, such as aluminum chloride or boron trifluoride.

37 Claims, No Drawings

HYDROCARBON RESINS FROM ARYL NORBORNENE DERIVATIVES

FIELD OF THE INVENTION

This invention relates to novel mixed aliphatic/aromatic hydrocarbon resins, particularly useful for tackifying purposes. Also, this invention relates to a novel process for preparing the hyrdrocarbon resins wherein 5-aryl-2-norbornene is polymerized, optionally with other alkenes, in the presence of a Friedel-Crafts catalyst. Products resulting from hydrogenation of the hydrocarbon resins are also included within the invention.

BACKGROUND OF THE INVENTION

Polymers produced from norbornene derivatives are well known in the art, and there are many processes known for the preparation of the polymers. Also known is the use of norbornene, and derivatives thereof, as monomers and comonomers in preparing polymeric materials. In general, norbornene, and derivatives thereof, can be polymerized by ring opening metathesis polymerization method (ROMP), or by catalysis method using metallocene or Ziegler-Natta catalysts. Polymers prepared by the ROMP method have unsaturated backbones, and the process involves opening of the strained, unsaturated and bridged 5-member ring of norbornene. Polymers prepared using Ziegler-Natta catalysts are addition polymers that preserve the norbornene structure. Ziegler-Natta catalysts are typically based on titanium compounds, in combination with an organoaluminum co-catalyst such as triethylaluminum.

Copolymers of norbornene, or substituted norbornene, with ethylene, are commercially available, and are primarily used for optical applications such as compact discs. A problem associated with norbornene-ethylene copolymers is that the copolymers are brittle below the glass transition temperature of the copolymers. It is known that the use of 5-aryl-substituted norbornene, such as 5-phenyl-2-norbornene overcomes the problem of brittleness associated with use of norbornene. It is also known that aryl-substituted norbornene, such as 5-phenyl-2-norbornene, can be copolymerized, using either metathesis catalysts such as tungsten halides or metallocene catalysts such as zirconocene, with other cyclic alkenes or ethylene, to provide interpolymers that exhibit satisfactory modulus, optical, impact-resistant and strength properties.

The polymeric products that are known and commercially available are generally high molecular weight polymers, having a $M_n$ molecular weight exceeding 4000, and as such, are not suitable for use as tackifiers. It is generally acknowledged that tackifying resins have number average molecular weights ($M_n$) in the range of about 100 to about 1500.

SUMMARY OF THE INVENTION

The present invention relates to certain mixed aliphatic/aromatic hydrocarbon resins, that are particularly suitable for use as tackifiers. The hydrocarbon resins are homopolymers of 5-aryl-2-norbornene, or interpolymers of 5-aryl-2-norbornene with at least one, or more, other cyclic or acyclic alkene. The aryl group of the 5-aryl-2-norbornene is any aromatic group or substituent having at least 5 carbon atoms preferably from 5 to about 20 carbon atoms. Exemplary aromatic groups or substituents include phenyl, substituted phenyl, indenyl, naphthyl, methylphenyl, ethylphenyl, propylphenyl, dimethylphenyl, n-butylphenyl, trimethylphenyl, t-butylphenyl, substituted indenyl, substituted naphthyl, and the like. The novel hydrocarbon resins are characterized by having, in combination, (a) a softening point ranging from about 50° C. to about 150° C., (b) a number average molecular weight ($M_n$) ranging from about 120 to about 1000, (c) a weight average molecular weight ($M_w$) ranging from about 150 to about 2000, (d) a z-average molecular weight ($M_z$) ranging from about 150 to about 4000, and (e) a level of aromatic hydrogen ranging from about 8% to about 40% with respect to the total hydrogen determined by $^1$H NMR.

The novel 5-aryl-2-norbornene homopolymers and interpolymers thereof with at least one, or more, other cyclic or acyclic alkene, may be hydrogenated to produce novel hydrogenated hydrocarbon resins. The hydrogenated resins have all the above-recited characteristics, (a) through (e), of the 5-aryl-2-norbornene homopolymers and interpolymers described above, and are further characterized by having (f) a mixed methylcyclohexane aniline cloud point (MMAP) ranging from about 15° C. to about 65° C.

The homopolymers of 5-aryl-2 norbornene, and the interpolymers thereof, with at least one, or more, other cyclic or acyclic alkene, and the resins resulting from the hydrogenation of the homopolymers and interpolymers of the 5-aryl-2-norbornene, are useful as tackifiers for non-woven, hot-melt and pressure sensitive adhesive formulations.

The novel process of the invention for producing the novel homopolymers of 5-aryl-2-norbornene, and interpolymers thereof with at least one, or more, other cyclic or acyclic alkene(s), described herein, is comprised as follows. A 5-aryl-2-norbornene, with a cyclic or acyclic alkene where an interpolymer is desired, is polymerized in the presence of a Friedel-Crafts catalyst, such as, for example, aluminum chloride and boron trifluoride, under suitable polymerization conditions.

DETAILED DESCRIPTION OF THE INVENTION

The present invention relates to certain mixed aliphatic/aromatic hydrocarbon resins, that are particularly suitable for use as tackifiers. The hydrocarbon resins are homopolymers of 5-aryl-2-norbornene, or interpolymers of 5-aryl-2-norbornene with at least one, or more, other cyclic or acyclic alkene. The aryl group of the 5-aryl-2-norbornene is any aromatic group or substituent having at least 5 carbon atoms preferably from 5 to about 20 carbon atoms. Exemplary aromatic groups or substituents include phenyl, substituted phenyl, indenyl, naphthyl, methylphenyl, ethylphenyl, propylphenyl, dimethylphenyl, n-butylphenyl, trimethylphenyl, t-butylphenyl, substituted indenyl, substituted naphthyl, and the like. The novel hydrocarbon resins are characterized by having, in combination, (a) a softening point ranging from about 50° C. to about 150° C., (b) a number average molecular weight ($M_n$) ranging from about 120 to about 1000, (c) a weight average molecular weight ($M_w$) ranging from about 150 to about 2000, (d) a z-average molecular weight ($M_z$) ranging from about 150 to about 4000, and (e) a level of aromatic hydrogen ranging from about 8% to about 40% with respect to the total hydrogen determined by $^1$H NMR.

The novel 5-aryl-2-norbornene homopolymers and interpolymers thereof with at least one, or more, other cyclic or acyclic alkene, may be hydrogenated to produce novel hydrogenated hydrocarbon resins. The hydrogenated resins have all the above-recited characteristics, (a) through (e), of the 5-aryl-2-norbornene homopolymers and interpolymers described above, and are further characterized by having (f)

a mixed methylcyclohexane aniline cloud point (MMAP) ranging from about 150° C. to about 65° C.

The homopolymers of 5-aryl-2 norbornene, and the interpolymers thereof, with at least one, or more, other cyclic or acyclic alkene, and the resins resulting from the hydrogenation of the homopolymers and interpolymers of the 5-aryl-2-norbornene, are useful as tackifiers for non-woven, hot-melt and pressure sensitive adhesive formulations.

The novel process of the invention for producing the novel homopolymers of 5-aryl-2-norbornene, and interpolymers thereof with at least one, or more, other cyclic or acyclic alkene(s), described herein, is comprised as follows. A 5-aryl-2-norbornene, with a cyclic or acyclic alkene where an interpolymer is desired, is polymerized in the presence of a Friedel-Crafts catalyst, such as, for example, aluminum chloride and boron trifluoride, under suitable polymerization conditions.

In further detail, the polymerization process may be operated either in a continuous manner, or, in a batch manner, utilizing a nitrogen-flushed, oven-dried round bottom flask equipped with an overhead stirrer and an additional funnel. In the batch process, the flask is charged with the 5-aryl-2-norbornene, and, optionally, the at least one, or more, other cyclic or acyclic alkene, and the desired Friedel-Crafts catalyst to form a mixture. The resultant mixture is stirred and heated at a temperature of at least 50° C., for a time sufficient to effect the polymerization reaction. The temperature in the polymerization process ranges from at least 50° C. to about 200° C., and, preferably, ranges from about 80 to about 140° C. The reaction time required for the polymerization process ranges from about one hour to about twenty hours, with a reaction time of about two to about six hours preferred. The reaction time is dependent on type of catalyst used, concentration of catalyst used, and other reaction conditions.

The at least one, or more, other alkene, that may be interpolymerized with the 5-aryl-2-norbornene, to provide the novel hydrocarbon resins, may be any cyclic or acyclic alkene having from about 3 to about 20 carbon atoms. Exemplary of suitable cyclic or acyclic alkenes are cyclopentene, dicyclopentadiene, 1,5-dicyclooctadiene, 3a,4,7,7a-tetrahydro-4,7-methanoindan (THMINA), 5,6-dihydrodicyclopentadiene, pentenes, piperylene, styrene, alpha-methylstyrene, indene, vinyltoluene, and the like.

In the polymerization process of the present invention there is used as the catalyst, any Friedel-Crafts catalyst. A Friedel-Crafts catalyst is well known to be a catalyst that is capable of catalyzing Friedel-Crafts alkylation/acylation reactions, which are the substitution reactions of hydrogens on an aromatic ring by alkyl groups or acyl groups. Exemplary Friedel-Crafts catalysts include any metal halide, such as aluminum chloride, aluminum chloride complex with hydrochloric acid, aluminum bromide, aluminum fluoride, zinc chloride, titanium chloride, tin chloride, and the like; any boron halide such as boron trifluoride ether complex, boron trifluoride phosphoric acid complex, boron trichloride, and the like; any strong acid such as sulfuric acid, phosphoric acid, hydrochloric acid, hydrofluoric acid, and the like. Friedel-Crafts catalysts preferred for use herein include anhydrous aluminum chloride, boron trifluoride ether complex, and the complex of boron trifluoride with phosphoric acid. The amount of Friedel-Crafts catalyst utilized in the polymerization process ranges from about 0.01% to about 20% by weight of the monomer content of the polymerization process, depending upon the temperature of the reaction, and other reaction conditions. Preferably, the amount of Friedel-Crafts catalyst used in the polymerization process ranges from about 0.1 to about 5% by weight of the monomer content.

The invention will be more readily understood by reference to the following examples. There are, of course, many other forms of this invention which will become obvious to one skilled in the art, once the invention has been fully disclosed, and it will accordingly be recognized that these examples are given for the purpose of illustration only, and are not to be construed as limiting the scope of this invention in any way.

EXAMPLES

In the following examples the test procedures listed below were used in evaluating the properties of the 5-aryl-2-norbornene homopolymers and the interpolymers of the 5-aryl-2-norbornene with the at least one, or more, cyclic or acyclic alkenes herein.

Gardner Color—Gardner color of molten resin was measured in accordance with ASTM-D-1544.

Metler Softening Point—the Metler softening point was measured in accordance with ASTM-D-6090-97.

Cloud Point—MMAP is the mixed methylcyclohexane aniline cloud point, that is determined in accordance with ASTM D 2500 (1991) modified as follows. Methylcyclohexane is substituted for the heptane; there is used resin/aniline/methylcyclohexane in a ratio of 1/2/1 (5 g/10 ml/5 ml); and the cloud point is determined by cooling a heated, clear blend of the resin, aniline and methylcyclohexane until complete turbidity occurs. DACP is the diacetone cloud point and is determined by cooling a heated homogeneous solution of 5 g resin, 5 g xylene and 5 g of diacetone alcohol to the temperature where the solution becomes cloudy.

Molecular Weight $M_n$ means number average molecular weight.

$M_w$ means weight average molecular weight.

$M_z$ means the higher moment of the higher molecular weight distribution based on the mathematical definition:

$$\frac{\sum n_i m_i^3}{\sum n_i m_i^2}$$

where $n_i$ is the number of molecules of molecular weight $M_i$.

Molecular Weight Measurement—The following equipment and procedures are used herein for the determination of molecular weight distributions of resins using gel permeation chromatography (GPC).

Equipment:

Viscotek DG-700 Solvent Degasser

Thermo Separation Products P1000 Pump

Thermo Separation Products AS100 Autosampler

Polymer Labs PLgel 3 micron Mixed-E Column, 300 mm×7.5 mm

Viscotek T50A Viscometer Detector

Viscotek LR40 Laser Refractometer Detector

Gateway P5–90 Computer with Viscotek Trisec GPC Software version 3.0

Run Conditions:

Solvent: Tetrahydrofuran (THF)

Column temperature: 50° C.

Sample concentration (calibration standards): approximately 1.75 mg/mL

Sample concentration (resin samples): approximately 5.25 mg/mL

Injection Volume: 100 microliters

Injections per sample: 2

Flow rate: 0.50 mL/min

Run time: 45 minutes per sample

Calibration:

The column is calibrated using polystyrene standards with peak molecular weights ranging from 162 to 19600. For each calibration standard, 35+/−1 mg of sample is dissolved in 20 mL of THF solvent. Aliquots of about 1.5 mL of each standard solution are loaded into the autosampler for analysis according to the run conditions shown above. The calibration is calculated using the Universal Calibration method. Molecular weight ($M_e$, $M_w$ and $M_z$) are obtained from the Universal Calibration curve.

Aromatic Hydrogen Content—the aromatic hydrogen content is defined as the ratio of integration area of aromatic hydrogen relative to the total integration area of hydrogen on the resin's proton nuclear magnetic resonance ($^1H$ NMR) spectrum.

$^1H$ NMR analyses of the resins in this invention were performed using a JEOL 400 MHz Eclipse+NMR system with a pulse interval of 10 seconds, acquisition time of 2.7 seconds, pulse angle of 45°, X resolution of 0.37 Hz and number of scans of 200. The resin NMR samples are prepared by dissolving known amounts of resins into a carbon tetrachloride solvent containing 0.1% V/V 1,4-dioxane as an internal standard. The carbon tetrachloride and 1,4-dioxane solvents are reagent grade and available from Aldrich Company. The aromatic and olefinic peak areas at approximately 7 ppm and at approximately 5.2 ppm, respectively, are integrated relative to the dioxane peak area at 3.53 ppm for comparative analysis.

Example 1

In this example, there is described the polymerization of 5-phenyl-2-norbornene, wherein the hydrocarbon resin was obtained in a high yield of about 76%, using a boron trifluoride catalyst.

To a nitrogen flushed, oven-dried, 500 mL, round-bottom 4-neck flask equipped with an overhead stirrer, thermometer, condenser and additional funnel was charged 120 g of 5-phenyl-2-norbornene, 30 g of toluene and 1.8 g of boron trifluoride diethyl ether complex ($BF_3.Et_2O$, 1,8% by weight of monomer). The reaction mixture was stirred and heated to 115° C. for 4 hours. At the end of 4 hours, the mixture was worked up by diluting with 150 mL of toluene. When the temperature dropped below 80° C., about 50 mL of 10% aqueous NaOH solution was added to neutralize the catalyst. The organic layer was separated from the mixture, dried, filtered and the volatile components were removed by heating under vacuum (10 mmHg) until the base temperature reached 271° C. The yield of the resin was about 76%. The molten resin displayed a 13 color on the Gardner scale (neat) and a softening point of 70° C. A $^1H$ NMR analysis showed that this resin had 33% of aromatic hydrogens (calculated theoretical value was 35.7%).

Further, the homopolymer of the 5-phenyl-2-norbornene had a number average molecular weight ($M_n$) of 150, a weight average molecular weight ($M_w$) of 170, and a z-average molecular weight ($M_z$) of 190.

Example 2

In this example there is described the preparation of a homopolymer of 5-phenyl-2-norbornene, in a high yield of about 80%, using a boron trifluoride complex as catalyst.

Using the same setup and under the similar conditions described in Example 1, 250 g of 5-phenyl-2-norbornene and 2.5 g (1% by weight) of boron trifluoride phosphoric acid complex ($BF_3.H_3PO_4$) were allowed to react at 130° C. for 4 hours. At the end of 4 hours, the mixture was worked up by diluting with 150 mL of toluene. When the temperature dropped below 80° C., about 100 mL of 10% aqueous NaOH solution was added to neutralize the catalyst. The organic layer was separated from the mixture, dried, filtered and the volatile components were removed by heating under vacuum (10 mmHg) until the base temperature reached 271° C. The yield of the resin was about 80%. The molten resin displayed an 18 color on the Gardner scale and a softening point of 68° C. A $^1H$ NMR analysis showed that this resin had 32.6% of aromatic hydrogens (calculated theoretical value was 35.7%). Further, the homopolymer of the 5-phenyl-2-norbornene had a number average molecular weight ($M_n$) of 150, a weight average molecular weight ($M_w$) of 190, and a z-average molecular weight ($M_z$) of 260.

Example 3

In this example, there is described the preparation of a homopolymer of 5-phenyl-2-norbornene, in a high yield of 66%, using an aluminum trichloride ($AlCl_3$) as catalyst.

Using the same reaction set-up and conditions as in Example 1, 100 g of 5-phenyl-2-norbornene, 25 g of mineral spirits and 0.5 g of aluminum chloride (0.5% by weight) were polymerized at 120° C. for 4 hours. Then the mixture was worked up by diluting with 150 mL of toluene. When the temperature dropped below 80° C., about 50 mL of 10% aqueous NaOH solution was added to neutralize the catalyst. The organic layer was separated from the mixture, dried, filtered and the volatile components were removed by heating under vacuum (10 mmHg) until the base temperature reached 271° C. The yield of the resin was 66%. The molten resin displayed a 15 color on the Gardner scale (neat) and a softening point of 95° C. A $^1H$ NMR analysis showed that this resin had 33.1% of aromatic hydrogens (calculated theoretical value was 35.7%). Further, the homopolymer of the 5-phenyl-2-norbornene had a number average molecular weight ($M_n$) of 190, a weight average molecular weight ($M_w$) of 450, and a z-average molecular weight ($M_z$) of 1590.

Example 4

In this example, there is described the preparation of an interpolymer of 5-phenyl-2-norbornene, styrene and THMINA (3a,4,7,7a-tetrahydro-4,7-methanoindan), in a high yield of about 81%, using aluminum trichloride ($AlCl1_3$) as catalyst.

To a nitrogen flushed, over-dried, 1 L round-bottom 4-neck flask equipped with an overhead stirrer, thermometer, condenser and additional funnel, was charged 150 g of 5-phenyl-2-norbornene, 50 g of mineral spirits and 2.8 g (0.8% by weight) of aluminum chloride. To the additional funnel was placed a premixed solution of 90 g of THMINA (3a,4,7,7a-tetrahydro-4,7-methanoindan), 60 g of styrene and 50 g of mineral spirits. The addition of the mixture (THMINA-styrene) was begun when the reaction solution reached 115° C. The addition was controlled very slowly so that the addition process required about 60 minutes. The reaction was allowed to proceed for an additional 3.5 hours. When the reaction was finished, the mixture was worked up by diluting with 100 mL of toluene and 200 mL of mineral spirits. When the temperature dropped below 100° C., about 100 mL of 10% aqueous NaOH solution was added to neutralize the catalyst. The organic layer was separated from the mixture, dried, filtered and the volatile components were stripped under vacuum (20 mmHg) until the base temperature reached 290° C. The yield of the resin was about 81%. The resin displayed an 18 color on the Gardner scale (neat) and a softening point of 99° C. $^1$H NMR analysis showed that this resin had 23% of aromatic hydrogens. Further, the interpolymer of 5-phenyl-2-norbornene, styrene and THMINA had a number average molecular weight ($M_n$) of 340, a weight average molecular weight ($M_w$) of 860, and a z-average molecular weight ($M_z$) of 3200.

Examples 5 and 6

In the following Examples 5 and 6, there is described the preparation of novel hydrogenated hydrocarbon resins. The novel hydrogenated hydrocarbon resins were prepared by hydrogenating the novel homopolymer of 5-phenyl-2-norbornene of Example 2, and by hydrogenating the novel interpolymer comprising 5-phenyl-2-norbornene, styrene and THMINA, of Example 4. The hydrocarbon resins of Examples 2 and 4 were hydrogenated using a palladium (Pd) catalyst comprising 1% Pd on alumina, available from Engelhard, under a reaction pressure of 1000 psig of hydrogen.

Example 5

In this example, there is described the preparation of a novel hydrogenated homopolymer of 5-phenyl-2-norbornene.

The 5-phenyl-2-norbornene homopolymer of Example 2 was used herein (referred to as resin). 500 g of a solution of the resin (in xylenes, 30% solids) and 18 g of Pd catalyst (1% Pd on alumina, available from Engelhard, S-95-618) were placed into a 2-liter autoclave. The hydrogenation was conducted at 1000 psig of $H_2$, 280° C. and held for 4 hours. At the end of the reaction, the solution was dried, filtered and the solvent was removed by stripping at 290° C./20 mmHg. Hydrogenated resin was obtained in 97% yield and the resin displayed a 7 color on the Gardner scale (neat) and a softening point of 70° C.

Example 6

In this example, there is described the preparation of a novel hydrogenated interpolymer comprised of 50% 5-phenyl-2-norbornene, 20% styrene and 30% THMINA, the resin produced in Example 4 (referred to as resin herein).

566 g of a solution of the resin (in mineral spirits, 36.5% solids) was treated with 25 g of alumina (obtained from LaRoche, A-2) at 250° C. for two hours in order to remove organic chlorides. Then the solution was dried and filtered. 492 g of the treated resin solution and 18 g of Pd catalyst (1% Pd on alumina, obtained from Engelhard, S-95–618) were placed into a 2-liter autoclave. The hydrogenation was conducted at 1000 psig of $H_2$, 250° C. and held for 4 hours. At the end of the reaction, the solution was dried, filtered and the solvent was removed by stripping under vacuum (20 mmHg) until the base temperature reached 290° C. Hydrogenated resin was obtained in 98% yield and it displayed a 9.5 color on the Gardner scale (neat) and a softening point of 105° C. $^1$H NMR showed aromatic hydrogen content of this resin was about 19%. Average number molecular weight $M_n$) was 350. Average weight molecular weight ($M_w$) was 810. The z-average weight molecular weight ($M_z$) was 2600. This resin had a cloud point of DACP 7.9° C. and MMAP 24.2° C. These cloud point data indicate this resin would be useful as a tackifying resin in many adhesive formulations.

The 5-aryl-2-norbornene homopolymers and interpolymers of this invention, and the hydrogenated 5-aryl-2-norbornene homopolymers and interpolymers of this invention have good properties with regard to compatibility and solubility and can be used effectively as tackifying resins in coatings and adhesives formulations including, but not limited to, non-woven, SBS, acrylics, SIS, and many other applications. The resins can also be used in sealants, paints, labels, tapes, modifiers, extenders and processing aids for plastics, printing inks, overprint varnishes and other clear coatings, textile dry sizes, ceramic tile grout, varnishes, waterproofing compositions and wax compounds.

Example 7

In a manner similar to Example 1 there are prepared homopolymers of 3-methyl-phenyl-2-norbornene and 4-methyl-phenyl-2-norbornene.

Example 8

In a manner similar to Example 4, there is prepared an interpolymer of 5-phenyl-2-norbornene with 1,5-cyclooctadiene.

It should be clearly understood that the forms of the invention herein described are illustrative only and are not intended to limit the scope of the invention. The present invention includes all modifications falling within the scope of the following claims.

I claim:

1. A homopolymer of 5-aryl-2-norbornene, wherein the aryl is an aromatic group having at least 5 carbon atoms, said homopolymer characterized by having (a) a softening point ranging from about 50° C. to about 150° C., (b) a number average molecular weight ($M_n$) ranging from about 120 to about 1000, (c) a weight average molecular weight ($M_w$) ranging from about 150 to about 2000, (d) a z-average molecular weight ($M_z$) ranging from about 150 to 4000, and (e) a level of aromatic hydrogen ranging from about 8% to about 40% with respect to the total hydrogen.

2. The homopolymer according to claim 1 wherein the aromatic group is selected from the group consisting of phenyl, substituted phenyl, indenyl, substituted indenyl, naphtyl and substituted naphthyl.

3. The homopolymer according to claim 2 wherein the aromatic group is selected from the group consisting of phenyl and substituted phenyl.

4. The homopolymer according to claim 3 wherein the aromatic group is phenyl.

5. An interpolymer comprising a 5-aryl-2-norbornene, and at least one, or more, other cyclic or acyclic alkene, wherein the aryl of the 5-aryl-2-norbornene is an aromatic group having at least 5 carbon atoms, wherein the alkene has from about 3 to about 20 carbon atoms, and wherein said interpolymer is characterized by having a softening point ranging from about 50° C. to about 150° C., (b) a number average molecular weight ($M_n$) ranging from about 120 to about 1000, (c) a weight average molecular weight (M,) ranging from about 150 to about 2000, (d) a z-average molecular weight ($M_z$) ranging from about 150 to about 4000, and (e) a level of aromatic hydrogen ranging from about 8% to about 40% with respect to the total hydrogen.

6. The interpolymer according to claim 5 wherein the aromatic group is selected from the group consisting of phenyl, substituted phenyl, indenyl, substituted indenyl, naphtyl and substituted naphthyl.

7. The interpolymer according to claim 6 wherein the aromatic group is selected from the group consisting of phenyl and substituted phenyl.

8. The interpolymer according to claim 7 wherein the aromatic group is phenyl.

9. The interpolymer according to claim 5 wherein the at least one, or more cyclic or acyclic alkene is selected from the group consisting of cyclopentene, dicyclopentadiene, 1,5-dicyclooctadiene, 3a,4, 7,7a-tetrahydro4,7-methanoindan, 5,6-dihydrodicyclopentadiene, pentenes, piperylene, styrene, alpha-methylstyrene, indene and vinyltoluene.

10. The interpolymer according to claim 5 wherein the aryl is phenyl, and wherein the alkenes are styrene and 3a,4,7,7a-tetrahydro-4,7-methanoindan.

11. A process for preparing a homopolymer of 5-aryl-2-norbornene wherein the aryl is an aromatic group having at least 5 carbon atoms, said homopolymer characterized by having (a) a softening point ranging from about 50° C. to about 150° C., (b) a number average molecular weight ($M_n$) ranging from about 120 to about 1000, (c) a weight average molecular weight ($M_w$) ranging from about 150 to about 2000, (d) a z-average molecular weight ($M_z$) ranging from about 150 to 4000, and (e) a level of aromatic hydrogen ranging from about 8% to about 40% with respect to the total hydrogen, said process comprising polymerizing, under polymerization conditions, a 5-aryl-2-norbornene wherein the aryl is an aromatic group having at least 5 carbon atoms in the presence of a Friedel-Crafts catalyst.

12. The process according to claim 11 wherein the aromatic group is selected from the group consisting of phenyl and substituted phenyl.

13. The process according to claim 11 wherein the Friedel-Crafts catalyst is selected from the group consisting of a metal halide, a boron halide and a strong acid.

14. The process according to claim 13 wherein the metal halide is aluminum trichloride and the boron halide is boron trifluoride.

15. A process for preparing an interpolymer comprising a 5-aryl-2-norbornene and at least one, or more, other cyclic or acyclic alkene, wherein the aryl of the 5-aryl-2-norbornene is an aromatic group having at least 5 carbon atoms, wherein the alkene has from about 3 to about 20 carbon atoms, and wherein said interpolymer is characterized by having (a) a softening point ranging from about 50° C. to about 150° C., (b) a number average molecular weight ($M_n$) ranging from about 120 to about 1000, (c) a weight average molecular weight ($M_w$) ranging from about 150 to about 2000, (d) a z-average molecular weight ($M_z$) ranging from about 150 to about 4000, and (e) a level of aromatic hydrogen ranging from about 8% to about 40% with respect to the total hydrogen, said process comprising polymerizing a 5-aryl-2-norbornene wherein the aryl of the 5-aryl-2-norbornene is an aromatic group having at least 5 carbon atoms, and at least one, or more, other cyclic or acyclic alkene having from about 3 to about 20 carbon atoms, under polymerization conditions, in the presence of a Friedel-Crafts catalyst.

16. The process according to claim 15 wherein the aromatic group is selected from the group consisting of phenyl and substituted phenyl.

17. The process according to claim 15 wherein the Friedel-Crafts catalyst is selected from the group consisting of a metal halide, a boron halide and a strong acid.

18. The process according to claim 17 wherein the metal halide is aluminum trichloride and the boron halide is boron trifluoride.

19. The process according to claim 15 wherein the at least one, or more, cyclic or acyclic alkene is selected from the group consisting of cyclopentene, dicyclopentadiene, 1,5-dicyclooctadiene, 3a,4, 7,7a-tetrahydro-4,7-methanoindan, 5,6-dihydrodicyclopentadiene, pentenes, piperylene, styrene, alpha-methylstyrene, indene and vinyltoluene.

20. The process according to claim 19 wherein the aryl is phenyl, and wherein the alkenes are styrene and 3a,4,7,7a-tetrahydro-4, 7-methanoindan.

21. A hydrogenated homopolymer of 5-aryl-2-norbornene, wherein the aryl is an aromatic group having at least 5 carbon atoms, said hydrogenated homopolymer characterized by having (a) a softening point ranging from about 50° C. to about 150° C., (b) a number average molecular weight ($M_n$) ranging from about 120 to about 1000, (c) a weight average molecular weight ($M_w$) ranging from about 150 to about 2000, (d) a z-average molecular weight ($M_z$) ranging from about 150 to about 4000, and (e) a level of aromatic hydrogen ranging from about 8% to about 40% with respect to the total hydrogen.

22. The hydrogenated homopolymer according to claim 21 wherein the aromatic group is selected from the group consisting of phenyl, substituted phenyl, indenyl, substituted indenyl, naphthyl and substituted naphthyl.

23. The hydrogenated homopolymer according to claim 22 wherein the aromatic group is selected from the group consisting of phenyl and substituted phenyl.

24. The hydrogenated homopolymer according to claim 23 wherein the aromatic group is phenyl.

25. A hydrogenated interpolymer comprising a hydrogenated interpolymer comprised of a 5-aryl-2-norbornene, and at least one, or more, other cyclic or acyclic alkene, wherein the aryl of the 5-aryl-2-norbornene is an aromatic group having at least 5 carbon atoms, wherein the alkene has from about 3 to about 20 carbon atoms, and wherein said hydrogenated interpolymer is characterized by having (a) a softening point ranging from about 50° C. to about 150° C., (b) a 5 number average molecular weight ($M_n$) ranging from about 120 to about 1000, (c) a weight average molecular weight ($M_w$) ranging from about 150 to about 2000, (d) a z-average molecular weight ($M_z$) ranging from about 150 to about 4000, and (e) a level of aromatic hydrogen ranging from about 8% to about 40% with respect to the 10 total hydrogen.

26. The hydrogenated interpolymer according to claim 25 wherein the aromatic group is selected from the group consisting of phenyl, substituted phenyl, indenyl, substituted indenyl, naphthyl and substituted naphthyl.

27. The hydrogenated interpolymer according to claim 26 wherein the aromatic group is selected from the group consisting of phenyl and substituted phenyl.

28. The hydrogenated interpolymer according to claim 25 wherein the at least one, or more, cyclic or acyclic alkene is selected from the group consisting of cyclopentene, dicyclopentadiene, 1,5-dicyclooctadiene, 3a,4,7,7a-tetrahydro-4,7-methanoindan, 5,6-dihydrodicyclopentadiene, pentenes, piperylene, styrene, alpha-methylstyrene, indene and vinyltoluene.

29. The hydrogenated interpolymer according to claim 25 wherein the aryl is phenyl, and wherein the alkenes are styrene and 3a, 4,7,7a-30 tetrahydro-4,7-methanoindan.

30. A tackifier composition comprising a homopolymer of 5-aryl-2-norbornene, wherein the aryl is an aromatic group having at least 5 carbon atoms, said homopolymer characterized by having (a) a softening point ranging from about 50° C. to about 150° C., (b) a number average molecular weight (M,) ranging from about 120 to about 1000, (c) a weight average molecular weight ($M_w$) ranging from about 150 to about 2000, (d) a z-average molecular weight ($M_z$) ranging from about 150 to about 4000, and (e) a level of aromatic hydrogen ranging from about 8% to about 40% with respect to the total hydrogen.

31. The tackifier composition according to claim 30 wherein the aromatic group of the homopolymer is selected from the group consisting of phenyl, substituted phenyl, indenyl, substituted indenyl, naphthyl and substituted naphthyl.

32. The tackifier composition according to claim 31 wherein the aromatic group is selected from the group consisting of phenyl and substituted phenyl.

33. A tackifier composition comprising an interpolymer comprising a 5-aryl-2-norbornene, and at least one, or more, other cyclic or acyclic alkene, wherein the aryl of the 5-aryl-2-norbornene is an aromatic group having at least 5 carbon atoms, wherein the alkene has from about 3 to about 20 carbon atoms, and wherein said interpolymer is characterized by having (a) a softening point ranging from about 50° C. to about 150° C., (b) a number average molecular weight ($M_n$) ranging from about 120 to about 1000, (c) a weight average molecular weight ($M$,) ranging from about 150 to about 2000, (d) a z-average molecular weight ($M_z$) ranging from about 150 to about 4000, and (e) a level of aromatic hydrogen ranging from about 8% to about 40% with respect to the total hydrogen.

34. The tackifier composition according to claim 33 wherein the aromatic group of the interpolymer is selected from the group consisting of phenyl, substituted phenyl, indenyl, substituted indenyl, naphthyl and substituted naphthyl.

35. The tackifier composition according to claim 34 wherein the aromatic group is selected from the group consisting of phenyl and substituted phenyl.

36. The tackifier composition according to claim 33 wherein the at least one, or more cyclic or acyclic alkene of the interpolymer is selected from the group consisting of cyclopentene, dicyclopentadiene, 1,5-dicyclooctadiene 3a,4,7,7a-tetrahydro-4,7-methanoindan, 5,6-dihydrodicyclopentadiene, pentenes, piperylene, styrene, alpha-methylstyrene, indene and vinyltoluene.

37. The tackifier composition according to claim 33 wherein the aryl is phenyl, and wherein the alkenes are styrene and 3a,4,7,7a-tetrahydro-4,7-methanoindan.

* * * * *